US009929973B2

(12) United States Patent
Rusinov

(10) Patent No.: US 9,929,973 B2
(45) Date of Patent: Mar. 27, 2018

(54) METHOD OF AND A SYSTEM FOR PROVIDING ACCESS TO A FILE TO A WEB RESOURCE

(71) Applicant: YANDEX EUROPE AG, Lucerne (CH)

(72) Inventor: Vladimir Alexandrovich Rusinov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/509,312

(22) PCT Filed: Apr. 7, 2015

(86) PCT No.: PCT/IB2015/052509
§ 371 (c)(1),
(2) Date: Mar. 7, 2017

(87) PCT Pub. No.: WO2016/055872
PCT Pub. Date: Apr. 14, 2016

(65) Prior Publication Data
US 2017/0244649 A1 Aug. 24, 2017

(30) Foreign Application Priority Data
Apr. 7, 2015 (RU) ................................ 2014140425

(51) Int. Cl.
*G06F 15/16* (2006.01)
*H04L 12/927* (2013.01)
(Continued)

(52) U.S. Cl.
CPC ........ *H04L 47/808* (2013.01); *H04L 63/0815* (2013.01); *H04L 63/10* (2013.01);
(Continued)

(58) Field of Classification Search
CPC ...... H04L 63/0815; H04L 67/02; H04L 67/34
See application file for complete search history.

(56) References Cited

U.S. PATENT DOCUMENTS 5,495,607 A * 2/1996 Pisello .............. G06F 17/30126
707/781
6,895,557 B1 5/2005 Wood et al.
(Continued)

FOREIGN PATENT DOCUMENTS

RU 2315349 C1 1/2008
RU 2523216 C2 7/2014
(Continued)

OTHER PUBLICATIONS

International Search Report and Written Opinion from PCT/IB2015/052509, dated Jul. 24, 2015, Thomas, Shane.
(Continued)

*Primary Examiner* — Chirag R Patel
(74) *Attorney, Agent, or Firm* — BCF LLP

(57) ABSTRACT

There is disclosed a method of and system for providing access to a file from a user to a web resource, without the web resource needing to store the file on its server. The method is executable at a first server, comprising receiving identification information from the user, via a communication network, from a second server, the second server storing the web resource, the identification information having been generated by the user having accessed the web resource, via an electronic device associated with the user, indicated a desire to provide access to the file to the web resource, been presented a form via the web resource, and entered identifying information into the form, accessing a user-associated storage account for the user based upon the identification information, the user-associated storage account being maintained at the first server, receiving a selection, via the form, from the user of the file to be accessed by the second server from files stored in the user-associated storage account, creating a file link to the file stored in the user-associated storage account and transmitting to the web resource the file link to the file stored in the user-associated
(Continued)

storage account, the file link configured to allow the second server to access the file stored on the first server without having to (i) transmit the file via the communication network from the first server to the second server and (ii) store it on the second server, the file becoming accessible to both the first server and the second server.

20 Claims, 11 Drawing Sheets

(51) Int. Cl.
*H04L 29/08* (2006.01)
*H04L 29/06* (2006.01)

(52) U.S. Cl.
CPC .............. *H04L 67/02* (2013.01); *H04L 67/06* (2013.01); *H04L 67/306* (2013.01); *H04L 67/34* (2013.01)

(56) References Cited

U.S. PATENT DOCUMENTS

| | | |
|---|---|---|
| 2002/0091646 A1 | 7/2002 | Lake et al. |
| 2005/0289198 A1 | 12/2005 | Todd |
| 2007/0143398 A1 | 6/2007 | Graham |
| 2007/0180449 A1* | 8/2007 | Croft .................... G06F 3/1415 718/1 |
| 2007/0250513 A1* | 10/2007 | Hall .................. G06F 17/30902 |
| 2008/0133701 A1 | 6/2008 | Kazmi et al. |
| 2008/0178230 A1 | 7/2008 | Eyal et al. |
| 2009/0029622 A1 | 1/2009 | Koyanagi et al. |
| 2011/0289513 A1* | 11/2011 | Degirmenci ............ G06F 9/542 719/313 |
| 2014/0208193 A1 | 7/2014 | Parmar et al. |
| 2014/0237571 A1 | 8/2014 | O'Brien et al. |

FOREIGN PATENT DOCUMENTS

| | | |
|---|---|---|
| WO | 2006052517 A1 | 5/2006 |
| WO | 2014075189 A1 | 5/2014 |

OTHER PUBLICATIONS

International Preliminary Report on Patentability from PCT/IB2015/052509, dated Jan. 7, 2016, Chang, Jungwon.

Document Transformations, retrieved from https://developers.filepicker.com/docs/support/general/41 on Mar. 7, 2017, 2 pages.

* cited by examiner

US 9,929,973 B2

METHOD OF AND A SYSTEM FOR PROVIDING ACCESS TO A FILE TO A WEB RESOURCE

CROSS-REFERENCE

The present application claims priority to Russian Patent Application No. 2014140425, filed Oct. 7, 2014, entitled "A METHOD OF AND A SYSTEM FOR PROVIDING ACCESS TO A FILE TO A WEB RESOURCE" the entirety of which is incorporated herein

FIELD

The present technology relates to methods of providing access to a file to a web resource.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of electronic devices (desktop, laptop, notebook, smartphone, tablets and the like) to have access to any number of web pages and rich content (like images, audio, video, animation, and other multimedia content from such networks).

When interacting with a typical web site, the user may have a goal to achieve certain user-needs. These user-needs may include downloading information from the web site. Examples of such downloaded information may include: financial information about a company, a bank statement from an online banking service provided by the user's bank, a movie to download and watch, an audio file to stream and the like. On the other hand, the user may need to upload information to the web site. Examples of such uploaded information may include files to be stored in a cloud storage service, a job application submitted via an on-line recruitment service, an entry visa application using an embassy visa application service, and the like.

SUMMARY

It is an object of the present technology to ameliorate at least some of the inconveniences present in the prior art.

Inventors have developed embodiments of the present technology based on their appreciation of at least one technical issue associated with the prior art solutions to uploading (or downloading) data to (from) a web resource via a communication network.

Specifically (but not limited to), an operator of the specific web site may need to receive files (or other information) from visitors to the web resource (such as a web site, for example). This may be the case in numerous situations, such as for example, the web site running a recruitment service and needing to receive uploaded users' curriculum vitae or other documents as part of a job application process.

Typically, in order to receive and store the documents submitted by such users, the operator of the specific web site would need to purchase a hosting service that includes large storage capacity to enable the operator to store all the received documents from all the potential job applicants using the web resource. Alternatively, the operator of such a web resource may store the received documents locally (such as on a hard drive type storage device or the like). Even in this scenario, the operator of the specific web resource would be required to establish large storage capacity for both storing the received documents and for back-up storage purposes.

In the reverse scenario, where the user may want to download information from the specific web site, the user typically downloads the information via a network and stores it locally on the hard drive of the computer (or any other electronic device used for such a downloading operation), for example. This situation requires the user's computer to have sufficient memory and may result in non-optimized use of user's computer memory capacity.

According to a first broad aspect of the present technology, there is provided a method of providing access to a file to a web resource from a user, the method executable at a first server, the method comprising receiving identification information from the user, via a communication network, from a second server, the second server storing the web resource, the second server being separate from the first server, both the first server and the second server being in communication via the communication network, the identification information having been generated by the user having accessed the web resource, via an electronic device associated with the user, the electronic resource being in communication with the communication network, indicated a desire to provide access to the file to the web resource, been presented a form via the web resource, and entered identifying information into the form, accessing a user-associated storage account for the user based upon the identification information, the user-associated storage account being maintained at the first server, receiving a selection, via the form, from the user of the file to be accessed by the second server from files stored in the user-associated storage account, creating a file indication of the file stored in the user-associated storage account, and transmitting to the web resource the file indication of the file stored in the user-associated storage account, the file indication configured to allow the second server to access the file stored on the first server without having to store it on the second server In some implementations of the method, the file indication is a link to the file stored in the user-associated storage account.

In some implementations of the method, said transmitting to the web resource the file indication comprises saving the file indication in a storage account associated with an administrator of the web resource.

In some implementations of the method, the identifying information is a user login information for the user-associated storage account maintained by the first server and said accessing the user-associated storage account comprises presenting to the user files previously stored in the user-associated storage account.

In some implementations of the method, the identifying information is a user login information for the user-associated storage account maintained by the first server and said accessing the user-associated storage account comprises presenting to the user files previously stored in the user-associated storage account, the method further comprising receiving an indication from the user, via the form, to copy the file to the user-associated storage account from the electronic device associated with the user via the communication network, receiving the file from the electronic device associated with the user via the communication network and storing the file in the user-associated storage account maintained by the first server.

In some implementations of the method, the identifying information is a user registration information for the user-associated storage account maintained by the first server, said receiving the identification information from the user further comprises creating the user-associated storage account maintained by the first server and said accessing the user-associated storage account comprises inviting the user, via the form, to copy the file to the user-associated storage account from the electronic device associated with the user via the communication network, receiving the file from the electronic device associated with the user via the communication network, and storing the file in the user-associated storage account maintained by the first server.

In some implementations of the method, the method further comprises transmitting a confirmation to the user, via the electronic device, that the web resource has been transmitted the file indication.

In some implementations of the method, the method further comprises transmitting a confirmation to an administrator of the web resource, via the communication network, that the web resource has been transmitted the file indication.

In some implementations of the method the file is a first file, the method further comprising receiving an indication from the web resource of a selection by the user of a second file on the web resource.

In some implementations of the method, the method further comprises receiving the second file from the web resource via the communication network and storing the second file in the user-associated storage account maintained by the first server.

In some implementations of the method, the method further comprises sending, to the web resource, an indication of the user having saved the second file in the user-associated storage account.

In some implementations of the method, the method further comprises sending, to the user via the electronic device associated with the user, a confirmation of the second file having been saved in the user-associated storage account.

In some implementations of the method, the form on the web resource is provided by the first server to the web resource as a script.

In some implementations of the method, the script is a Java script.

In some implementations of the method, the script is a PHP Server-Side scripting language.

In some implementations of the method, the script is an HTML script.

In some implementations of the method, the script is a CGI script.

According to another broad aspect of the present technology, there is provided a server for providing access to a file to a web resource from a user, the server comprising: a communication interface for communication with an electronic device via a communication network and a processor operationally connected with the communication interface, the processor configured to receive identification information from the user, via the communication network, from a second server, the second server storing the web resource, the second server being separate from the server, both the server and the second server being in communication with the communication network, the identification information having been generated by the user having accessed the web resource, via an electronic device associated with the user, the electronic resource being in communication with the communication network, indicated a desire to provide access to the file to the web resource, been presented a form via the web resource, and entered identifying information into the form, access a user-associated storage account for the user based upon the identification information, the user-associated storage account being maintained by the server, receive a selection from the user, via the form, of the file to be accessed by the second server, create a file indication of the file stored in the user-associated storage account and transmit to the web resource the file indication of the file stored in the user-associated storage account, the file indication configured to allow the second server to access the file stored on the server without having to store it on the second server.

In some implementations of the server, the file indication is a link to the file stored in the user-associated storage account.

In some implementations of the server, to transmit to the web resource the file indication the processor is configured to save the file indication to a storage account associated with an administrator of the web resource.

In some implementations of the server, the identifying information is a user login information for the user-associated storage account maintained by the server and to access the user-associated storage account the processor is configured to present to the user files previously stored in the user-associated storage account.

In some implementations of the server, the identifying information is a user login information for the user-associated storage account maintained by the server and to access the user-associated storage account the processor is configured to present to the user files previously stored in the user-associated storage account, the processor being further configured to receive an indication from the user, via the form, to copy the file to the user-associated storage account from the electronic device associated with the user via the communication network, receive the file from the electronic device associated with the user via the communication network, and store the file in the user-associated storage account maintained by the server.

In some implementations of the server, the identifying information is a user registration information for the user-associated storage account maintained by the server, to receive the identification information from the user, the processor is further configured to create the user-associated storage account maintained by the server and to access the user-associated storage account, the processor is configured to invite the user, via the form, to copy the file to the user-associated storage account from the electronic device associated with the user via the communication network, receive the file from the electronic device associated with the user via the communication network, and store the file in the user-associated storage account maintained by the server.

In some implementations of the server, the processor is further configured to transmit a confirmation to the user, via the electronic device, that the web resource has been transmitted the file indication.

In some implementations of the server, the processor is further configured to transmit a confirmation to an administrator of the web resource, via the communication network, that the web resource has been transmitted the file indication.

In some implementations of the server, the file is a first file and the processor is further configured to receive a second file from the web resource via the communication network and store the second file in the user-associated storage account maintained by the server.

In some implementations of the server, the file is a first file and the processor is further configured to receive an indication from the web resource of a selection by the user of a second file on the web resource.

In some implementations of the server, the processor is further configured to receive the second file from the web resource via the communication network and store the second file in the user-associated storage account maintained by the first server.

In some implementations of the server, the processor is further configured to send, to the web resource, an indication of the user having saved the second file in the user-associated storage account.

In some implementations of the server, the processor is further configured to send, to the user via the electronic device associated with the user, a confirmation of the second file having been saved in the user-associated storage account.

In some implementations of the server, the form on the web resource is provided by the server to the web resource as a script.

In some implementations of the server, the script is a Java script.

In some implementations of the server, the script is a PHP Server-Side scripting language.

In some implementations of the server, the script is an HTML script.

In some implementations of the server, the script is a CGI script.

In the context of the present specification, unless provided expressly otherwise, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, unless provided expressly otherwise, the expression "information" includes information of any nature or kind whatsoever capable of being stored in a database. Thus information includes, but is not limited to audiovisual works (images, movies, sound records, presentations etc.), data (location data, numerical data, user names, passwords, email addresses, etc.), text (opinions, comments, questions, messages, etc.), documents, spreadsheets, etc.

In the context of the present specification, unless provided expressly otherwise, the expression "component" is meant to include software (appropriate to a particular hardware context) that is both necessary and sufficient to achieve the specific function(s) being referenced.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope or set forth the bounds of the present technology. In some cases, helpful examples of modifications may be set forth as an aid to understanding the present technology, and not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that particular aspect of the present technology. As a person skilled in the art would understand, this is likely not the case. In addition it is to be understood that the present detailed description provides in certain instances simple implementations of the present technology, and that where such is the case they have been presented in this manner as an aid to understanding. As persons skilled in the art would understand, various implementations of the present technology may be of a greater complexity.

Figure 1:
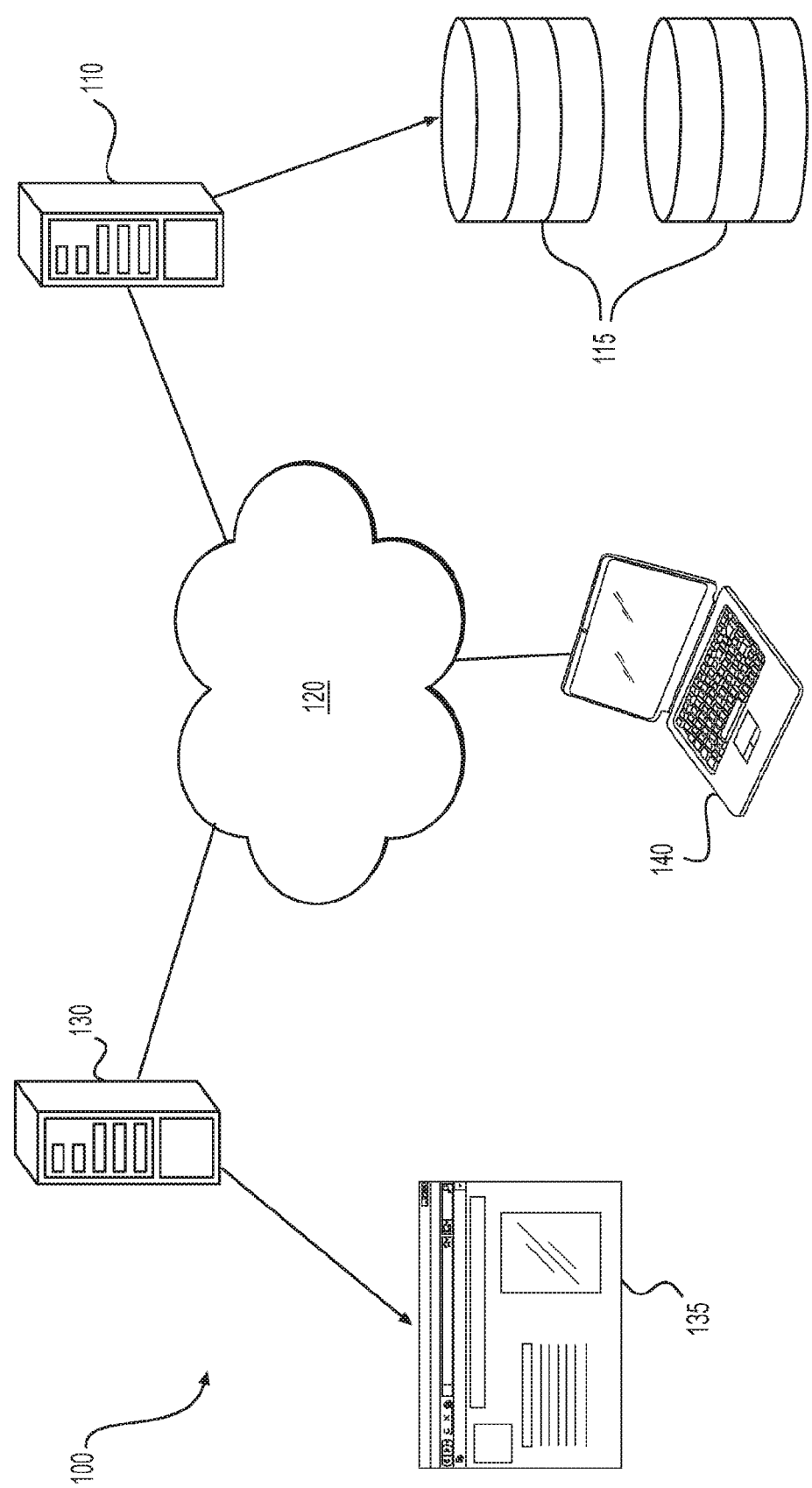
FIG. 1 depicts a system implemented in accordance with non-limiting embodiments of the present technology.

Referring to FIG. 1, a simplified schematic representation of a system 100 is depicted. Included in the system 100 are electronic devices 140, the electronic devices 140 including one or more of an electronic device 140, the electronic device 140 being a device associated with and utilized by the user of the system 100.

In the context of the present technology, the electronic device 140 can be implemented as any computer hardware that is capable of running software appropriate to the relevant task at hand. Thus, some (non-limiting) examples of electronic devices 140 include general purpose personal computers (desktops, laptops, netbooks, etc.), mobile computing devices, smartphones, and tablets, as well as network equipment such as routers, switches, and gateways. It should be noted that a electronic device 140 acting as a computing apparatus in the present context is not precluded from acting as a server to other electronic device 140. The use of the expression "an electronic device" does not preclude multiple electronic devices being used in receiving/sending, carrying out or causing to be carried out any task or request, or the consequences of any task or request, or steps of any method described herein.

The system 100 further includes a communication network 120. In some non-limiting embodiments of the present technology, the communication network 120 can be implemented as an Internet network. Alternatively, the communication network 120 can be implemented as any type of private or public network suitable for enabling various devices connected thereto to send and receive information.

The system 100 further includes web resource host servers 130 and executing servers 110. The web resource host servers 130 store the web resources 135. The web resources 135 can be, but are not limited to, web sites or web pages. The executing servers 110 maintain at least one database (not depicted) that can maintain at least one user-associated storage account 115 for the user (not depicted) of the system 100. For the purposes of the description to be presented herein below, the user will be assumed to be using the electronic device 140 to access the web resource 140 and/or to sign up/use the cloud storage service provided by the executing server 110.

For simplicity purposes, and for the sake of the present description, the system 100 is depicted with only three categories of node, namely electronic devices 140, web resource host servers 130 and executing servers 110 connecting through a communication network 120. However, those skilled in the art will recognize that the system 100 could include many more categories of node, and in each category of node, multiple types of equipment could be used. Each category of node may communicate with the other categories of node, in accordance with established protocols and standards.

Additionally, the number of each node may be different in different implementations, where the user may use one or more electronic devices 140 to access the communication network 120 in order to access a single or multiple web resource host servers 130 or a single or multiple executing servers 110.

The implementations of the executing server 110 are well known in the art and, as such, will not be described here at much length. Suffice it to state, that the executing server comprises hardware and/or software and/or firmware (collectively referred to as a "server communication interface") to connect to the communication network 120 for a two-way communication with other device communicatively coupled thereto). The executing server 110 further comprises a processor and a storage media, the storage media comprising computer-executable instructions, which instructions when executed cause the processor of the executing server 110 to execute a cloud storage service, as well as other routines and methods to be described herein below.

The term cloud service is well understood in the art. However, briefly, the cloud server allows the user of the electronic device to sign up for a user-associated storage account hosted on the executing server 110. This storage account is located remotely from the electronic device 140 and can be accessed through the communication network 120, hence the name "cloud service" or "cloud storage".

Users use cloud services for a number of purposes. Some of them include but are not limited to are: secure storage of information away from the electronic device 140, storage of information away from the electronic device 140 in those scenario where storage capacity of the electronic device 140 is limited or has been used up, for backing up purposes and the like.

How the user can sign up for the user-associated account 135 is not limited and various approaches are known in the prior art. As such, these approaches will not be described here at any length. Suffice it to say that how the user signs up for the cloud service, whether it is a free or paid-for service, the amount of storage space available for any given user are not to be used as limitations on the embodiments of the present technology.

Figure 2:
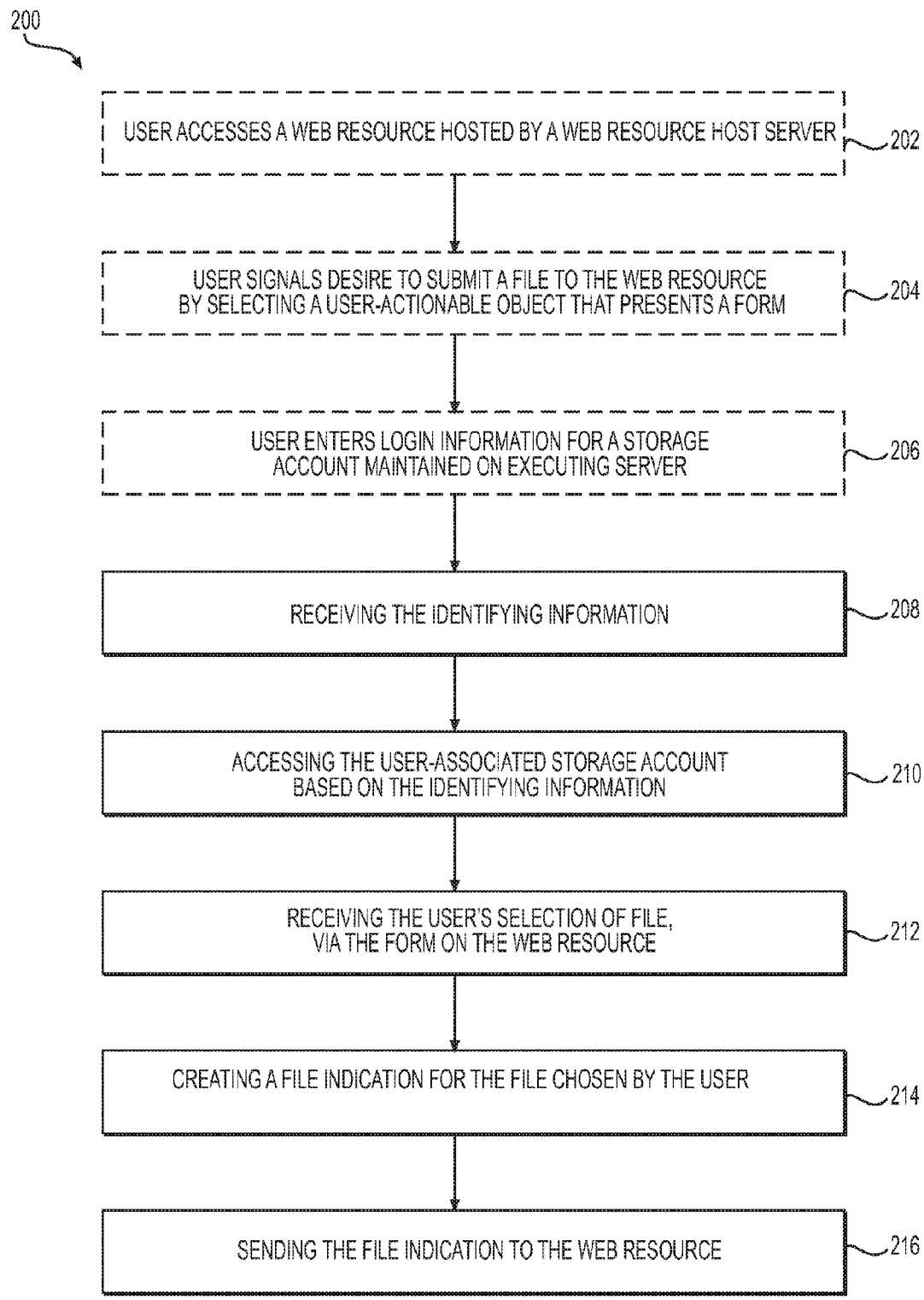
FIG. 2 is a flow diagram of a method for providing access to a file to a web resource, the method being executable within the system of FIG. 1 and being implemented in accordance with non-limiting embodiments of the present technology.

A flow diagram for a non-limiting embodiment of a method 200 for providing access to a file to a web resource implemented according to the present technology is presented in FIG. 2. The method 200 can be executed by the executing server 110.

The method 200 begins, at step 208, where the executing server 110 receives identifying information associated with the user from the web resource 135 (and more specifically, from the web resource host server 130) via the communication network 120. Within embodiments of the present technology, the identifying information has been generated by the web resource host server 130 hosting the web resource 135 in the following manner.

At step 202, the user has accessed the web resource 135 hosted on the web resource host server 130. The user may have used a web browser installed on the electronic device 140, such as, a YANDEX™ browser or the like. Naturally, any other commercially available or a proprietary browser can be used.

How the user accesses the web resource 135 is not particularly limited. The user may type in a Unified Resource Locator (URL) or another suitable web resource address associated with the web resource 135 into the web browser. Alternatively, the user may activate a hyperlink available to the user on another web resource, in an electronic message or otherwise.

Then, at step 204, the user has signaled a desire to provide access to a file to the web resource 135 by activating a form on the web resource 135. How the form is generated will be described in greater detail herein below. Using the form, then at step 206, the user enters their identifying information. The nature of the user identifying information is not particularly limited and various examples will be provided herein below.

The web resource 135 captures the user's identifying information and transmits same (or at least a portion thereof) to the executing server 110 via the communication network 120. This identifying information can be transmitted using known protocols (encrypted or not, as the case may be). In some embodiments, the information can be transmitted as an HTML message. Alternatively, the information can be transmitted a JSON message.

It should be noted that in FIG. 2, steps 202 to 206 are depicted in dotted lines, as they do not form part of the method 200 executed on the executing server 110 per se.

The method 200 then proceeds to step 210, where the executing server 110 accesses a user-associated storage account 115 which is maintained on the executing server 110. The executing server 110 can identify the specific user-associated storage account 115, evaluate user's permission to access the user-associated storage account 115 based at least partially on the identifying information received as part of step 208.

Within these implementations of the present technology, it shall be assumed that the user has previously signed up for the user-associated storage account 115. As has been mentioned above, how the user signs up for the user-associated storage account 115 is not particularly limited and is well known to those of skill in the art.

Next, at step 212, the executing server 110 receives a selection from the user of the file to be accessed by the web resource 135, via the form presented by the web resource 135. In some embodiments, the selection is made from the one or more files stored within the user-associated storage account 115. As such, in some embodiments, as part of step 212, the executing server 110 transmits to the web resource host server 130 an indication of the one or more files stored in the user-associated storage account 115 for displaying to the user prior to the user making a selection therefrom.

Based on the selection by the user which has been received as part of step 212, the executing server 110, at step 214, creates a file indication of the file chosen by the user as part step 212 (namely, an indication of which file has been received from the web resource host server 130). It is noted that the file chosen may include one or more files chosen by the user, depending on how the web resource host server 130 implements the file selecting routine (i.e. it may be desirable to limit file choosing routine to one file at a time or to multiple files at a time, both known to those of skill in the art).

The file indication can be, but is not limited to, a link to the file chosen by the user in user-associated storage account 115. The link can be executed as a hyperlink or any other suitable pointer to the file stored within the user-associated storage account 115.

Then, at step 216, the executing server 110 transmits the file indication to the web resource 135 (or, more specifically, to the web resource host server 130). Given the example above that the file indication may contain the link to one or more files, stored on the user-associated storage account 115 (the one or more files having been selected by the user), the web resource host server 130 gains access to the selected files without having to store them locally or within its own cloud storage service. In other words, the web resource host server 130 gets access to one or more of user selected files without the need to store them at the web resource host server 130 or elsewhere.

Figure 3:
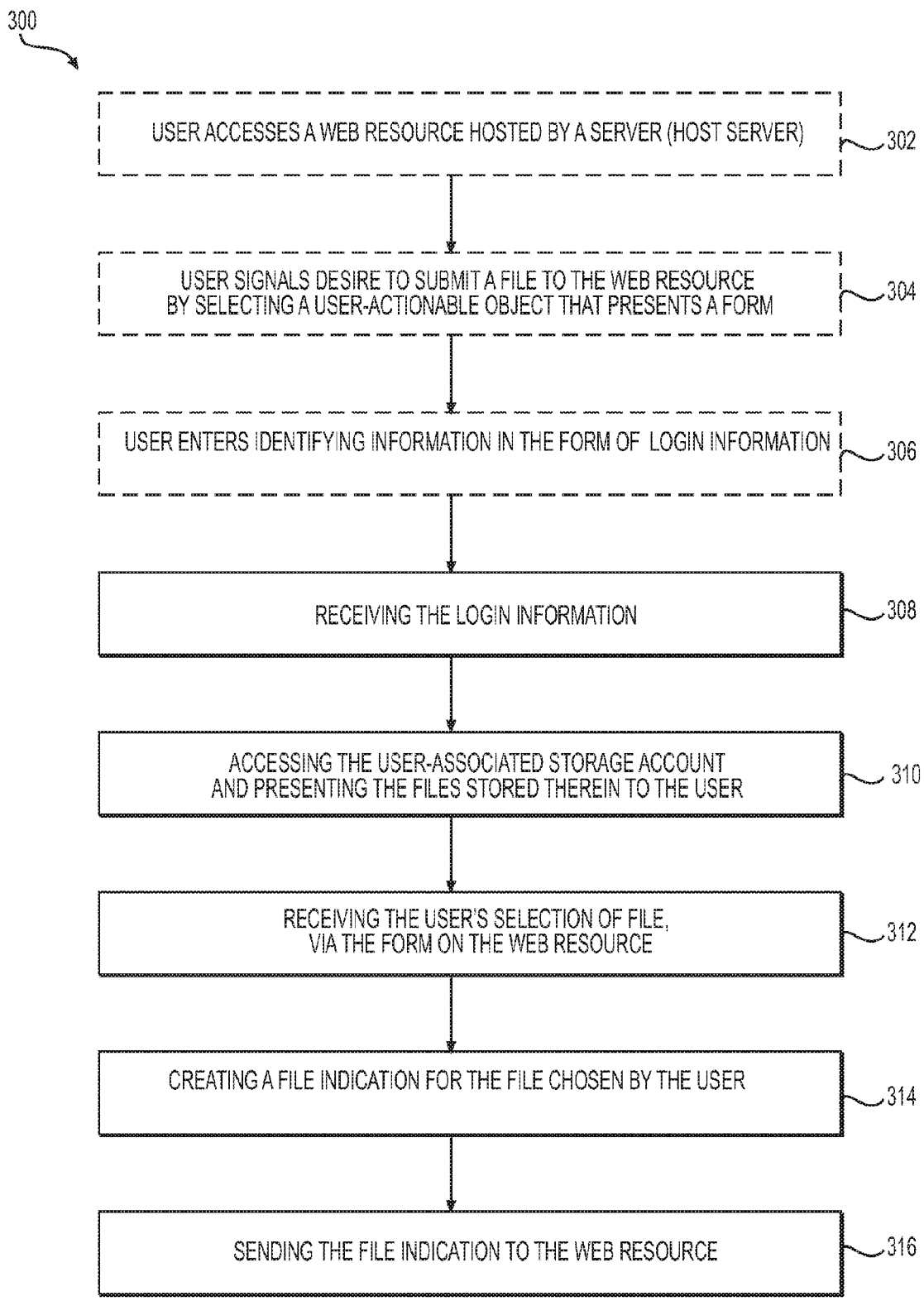
FIG. 3 is a flow diagram of a method for providing access to a file to a web resource, the method being executable within the system of FIG. 1 and being implemented in accordance with non-limiting embodiments of the present technology.

A flow diagram for another non-limiting embodiment of a method 300 for providing access to a file to a web resource 135 implemented according to the present technology is presented in FIG. 3. The method 300 can be executed by the executing server 110.

The method 300 begins at step 308, where the executing server 110 receives identifying information associated with the user from the web resource hosting server 130 hosting the web resource 135. Within these non-limiting embodiments of the present technology, the identifying information associated with the user may be in the form of user login information. The user login information may include a user login name and user login password. Naturally, any other combination is possible. For example, the user login password may include multiple log in passwords and/or answers to login challenge questions.

The user login information is received from the web resource 135 (or, more specifically from the web resource host server 130), the web resource 135 having obtained the information in the following manner.

At step 302, the user accesses the web resource 135 on the web resource host server 130. Step 302 can be executed substantially similar to step 202 described above.

The user then signals, at step 304, a desire to provide access to a file to the web resource 135 by activating a form on the web resource 135. The user then enters, at step 306, their identifying information, in the form of login information, into the form.

The web resource 135 captures the user's identifying information in the form of login information and transmits same (or at least a portion thereof) to the executing server 110 via the communication network 120. This information can be transmitted using known protocols (encrypted or not, as the case may be). It should be noted that in FIG. 3, steps 302 to 306 are depicted in dotted lines, as they do not form part of the method 300 executed on the executing server 110 per se.

The method 300 then proceeds to step 310, where the executing server 110 accesses a user-associated storage account 115 which is maintained on the executing server 110. Within these implementations of the present technology, the user has previously signed up for the user-associated storage account 115 and has provided log in credentials for accessing the user-associated storage account 115. Within these embodiments, the executing server 110 accesses the user-associated storage account 515 based on user login information received at step 308. More specifically, the executing server 110 can identify the specific user-associated storage account 115, evaluate user's permission to access the user-associated storage account 115 based at least partially on the log in information received as part of step 308.

Next, at step 312, the executing server 110 receives a selection from the user of the file to be accessed by the web resource 135, via the form presented by the web resource 135. In some embodiments, the selection is made from the one or more files stored within the user-associated storage account 115. As such, in some embodiments, as part of step 312, the executing server 110 transmits to the web resource host server 130 an indication of the one or more files stored in the user-associated storage account 115 for displaying to the user prior to the user making a selection therefrom.

Based on the selection by the user, the executing server 110, at step 314, creates a file indication of the file chosen by the user as part step 312 (namely, an indication of which file has been received from the web resource host server 130). It is noted that the file chosen may include one or more files chosen by the user, depending on how the web resource host server 130 implements the file selecting routine (i.e. it may be desirable to limit file choosing routine to one file at a time or to multiple files at a time, both known to those of skill in the art).

The file indication can be, but is not limited to, a link to the file chosen by the user in user-associated storage account 115. Then, at step 316, the executing server 110 transmits the file indication to the web resource 135 (or, more specifically, to the web resource host server 130). Given the example above that the file indication may contain the link to one or more files, stored on the user-associated storage account 115 (the one or more files having been selected by the user), the web resource host server 130 gains access to the selected files without having to store them locally or within its own cloud storage service. In other words, the web resource host server 130 gets access to one or more of user selected files without the need to store them at the web resource host server 130 or elsewhere.

Figure 4:
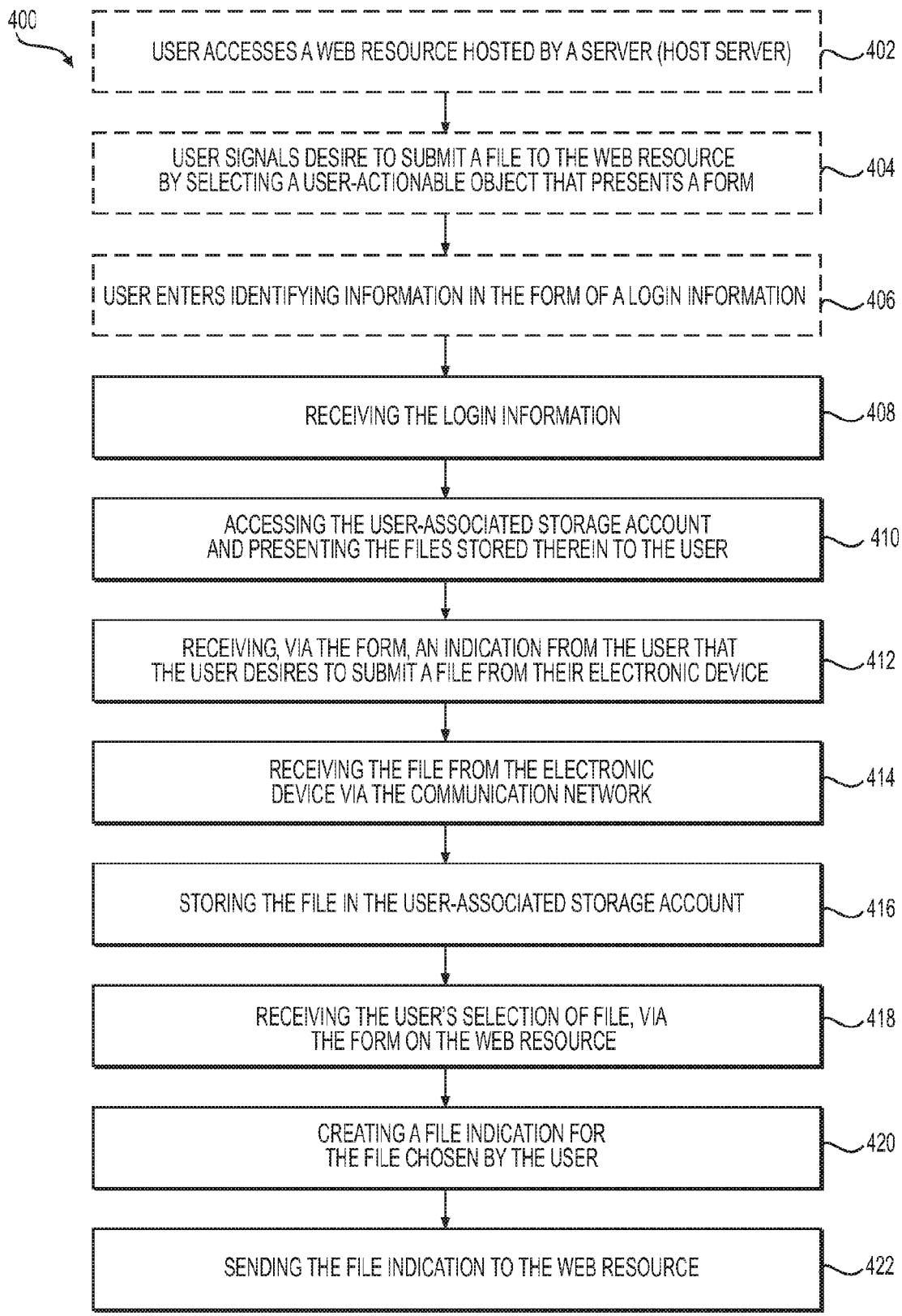
FIG. 4 is a flow diagram of a method for providing access to a file to a web resource, the method being executable within the system of FIG. 1 and being implemented in accordance with non-limiting embodiments of the present technology.

A flow diagram for another non-limiting embodiment of a method 400 for providing access to a file to a web resource 135 implemented according to the present technology is presented in FIG. 4. The method 400 can be executed on the executing server 110

The method 400 begins with the executing server 110 receiving, at step 408, identifying information associated with the user, in the form of login information, from the web resource host server 130 hosting the web resource 135. More specifically, the executing server 110 can receive the identifying information in the form of login information from the web site host server 130, the identifying information in the form of login information having been generated as follows.

At step 402, the user accesses the web resource 135 hosted on the web resource host server 130. Again, how the user accesses the web resource 135 is not particularly limited and various examples provided above can be used.

The user then, at step 404, signals a desire to provide access to a file to the web resource 135 by activating a form on the web resource 135. The user then enters, at step 406, their login information into the form.

The web resource 135 captures the user's identifying information and transmits same (or at least a portion thereof) to the executing server 110 over the communication network 120. This information can be transmitted using known protocols (encrypted or not, as the case may be). It should be noted that in FIG. 4, steps 402 to 406 are depicted in dotted lines, as they do not form part of the method 400 executed on the executing server 110 per se.

Based on the login information of the user and has been explained above, the executing server 110 then, at step 410, accesses the user-associated storage account 115 which is maintained on the executing server 110. The executing server 110 then presents the files previously saved to the user-associated storage account 115 to the user via the form on the web resource 135. More specifically, the executing server 110 transmits an indication of the one or more file stored within the user-associated storage account 115 to the electronic device 140 for presentation to the user using the form on the web resource 135.

For the purposes of this embodiment, it shall be assumed that the user does not need to provide access to one of the files stored on the executing server 110, but rather would like to provide access to one or more files stored locally on the electronic device 140. Hence, at step 412, upon receiving an indication, via the form, from the user that the user would prefer to provide access to a file from the electronic device 140 associated with the user to the web resource 135, the executing server 110, at step 414, receives the file from the electronic device 140 via the communication network 120.

The execution server 110 then, at step 416 stores the file in the user-associated storage account 115. In some embodiments, the step 412 can be executed before step 410 and, as such, step 410 (or at least part of can be omitted in case the user indicates her desire to upload a file from the electronic device 140.

Then, at step 418, the execution server 110 receives a selection of the file to provide access to for the web resource 135 from the user. In some embodiments, the step 418 can be executed implicitly by the user uploading one or more files via the form on the web resource 135. In other embodiments, as part of step 418, the user provides an affirmative confirmation, an indication of which is captured by the web resource 135 and transmitted to the executing server 110.

Based on the selection by the user, the executing server 110, at step 420, creates a file indication of the file chosen by the user as part step 418 (namely, an indication of which file has been received from the web resource host server 130). It is noted that the file chosen may include one or more files chosen by the user, depending on how the web resource host server 130 implements the file selecting routine (i.e. it may be desirable to limit file choosing routine to one file at a time or to multiple files at a time, both known to those of skill in the art).

The file indication can be, but is not limited to, a link to the file chosen by the user to be uploaded or that previously had been uploaded to the user-associated storage account 115. Then, at step 422, the executing server 110 transmits the file indication to the web resource 135 (or, more specifically, to the web resource host server 130).

Given the example above that the file indication may contain the link to one or more files, stored on the user-associated storage account 115 (the one or more files having been selected by the user), the web resource host server 130 gains access to the selected files without having to store them locally or within its own cloud storage service. In other words, the web resource host server 130 gets access to one or more of user selected files without the need to store them at the web resource host server 130 or elsewhere.

Figure 5:
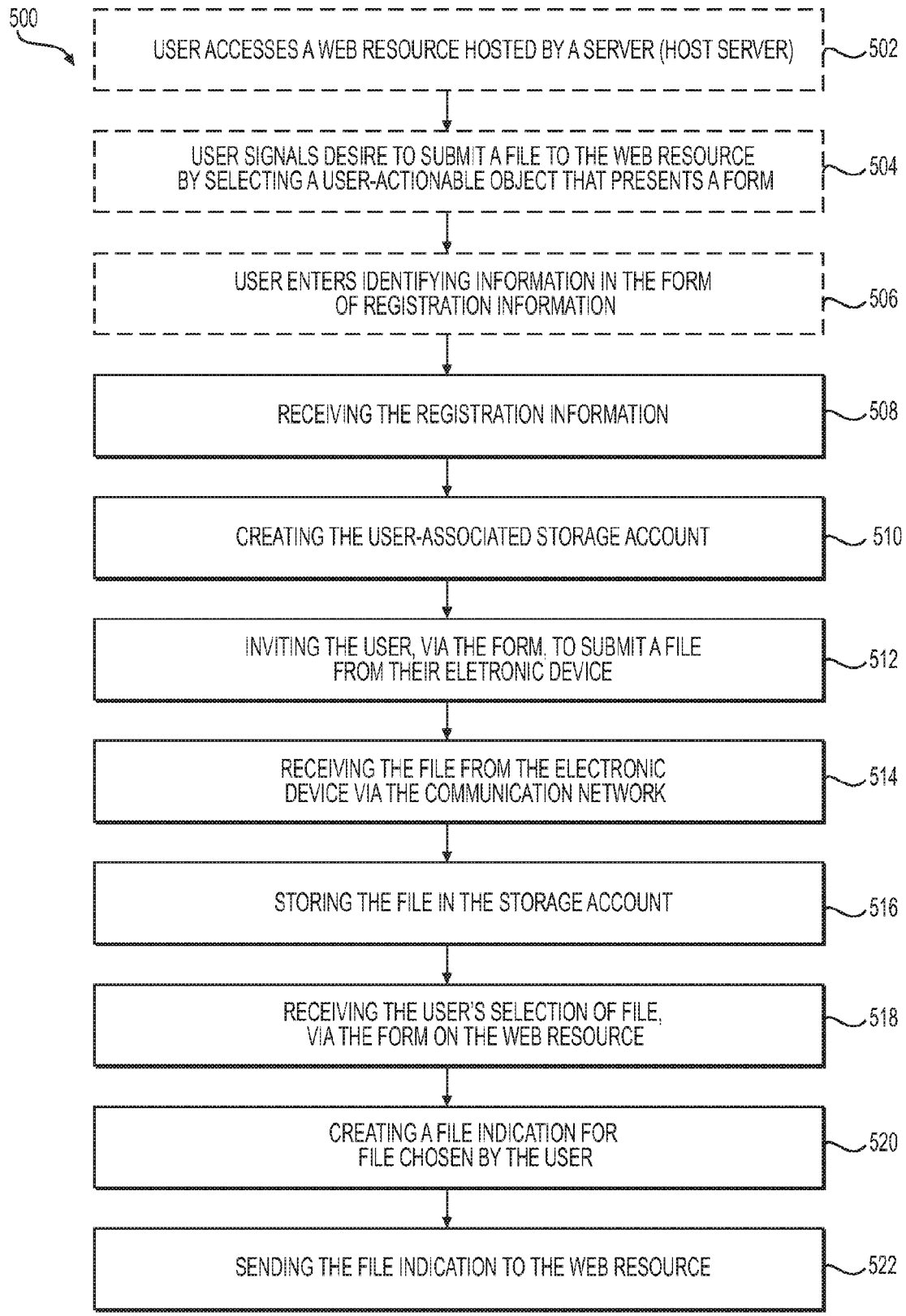
FIG. 5 is a flow diagram of a method for providing access to a file to a web resource, the method being executable within the system of FIG. 1 and being implemented in accordance with non-limiting embodiments of the present technology.

A flow diagram for another non-limiting embodiment of a method 500 for providing access to a file to a web resource 135 implemented according to the present technology is presented in FIG. 5. The method 500 can be conveniently executed by the executing server 110. For the method 500, it is assumed that the user has not previously registered with the cloud storage service provided by the executing server 110. In other words, the user is not yet associated with the user-associated storage account 115.

The method 500 begins at step 508, where the executing server 110 receives identifying information, in the form of registration information, from the web resource 135. The registration information may include the user name, the password, as well as other user information required for setting up the user-associated storage account 115 (such as user address, user ID details (for example, driver's license number and the like), financial institution or credit card information for payment or identity verification and the like). The registration information has been generated by the web resource 135 in the following manner.

The user first accesses, at step 502, the web resource 135 on the web resource host server 130. How the user can access the web resource 135 has been described above. The user then, at step 504, signals a desire to provide access to a file to the web resource 135 by activating a form on the web resource. It is noted that the registration form may be different from the form used for selecting file(s) to provide access to and specifically developed to solicit the user registration information.

The user then, at step 506, enters their registration information into the form.

The web resource 135 captures the user's registration information and transmits same (or at least a portion thereof) to the executing server 110 over the communication network 120. This information can be transmitted using known protocols (encrypted or not, as the case may be). It should be noted that in FIG. 5, steps 502 to 506 are depicted in dotted lines, as they do not form part of the method 500 executed on the executing server 110 per se.

Based on the registration information, the executing server 110 then, at step 510 creates the user-associated storage account 115, which is maintained on the executing server 110. The executing server 110 then, at step 512, invites the user to submit a file from their electronic device 140. Within embodiments of the present technology, step 512 is executed by the web resource 135 presenting an interface through the form to indicate the file for which access is to be provided to the web resource 135.

At step 514, the executing server 111 receives the file (or a plurality of files) chosen by the user to provide to the web resource 135 from the electronic device 140. The executing server 110 then, at step 516, stores the file (or the plurality of files) in the user-associated storage account 115.

The executing server 110 then, at step 518, receives a selection from the user of the file to be provided access to for the web resource 135, via the form presented by the web resource 135. In some embodiments, the selection is received implicitly by the user uploading the file (or the plurality of files).

Based on the selection by the user, the executing server 110 then, at step 520, creates a file indication of the file chosen by the user in step 518.

The file indication can be, but is not limited to, a link to the file chosen by the user in user-associated storage account 115. Then, at step 522, the executing server 110 transmits the file indication to the web resource 135 (or, more specifically, to the web resource host server 130).

Given the example above that the file indication may contain the link to one or more files, stored on the user-associated storage account 115 (the one or more files having been selected by the user), the web resource host server 130 gains access to the selected files without having to store them locally or within its own cloud storage service. In other words, the web resource host server 130 gets access to one or more of user selected files without the need to store them at the web resource host server 130 or elsewhere.

Figure 6:
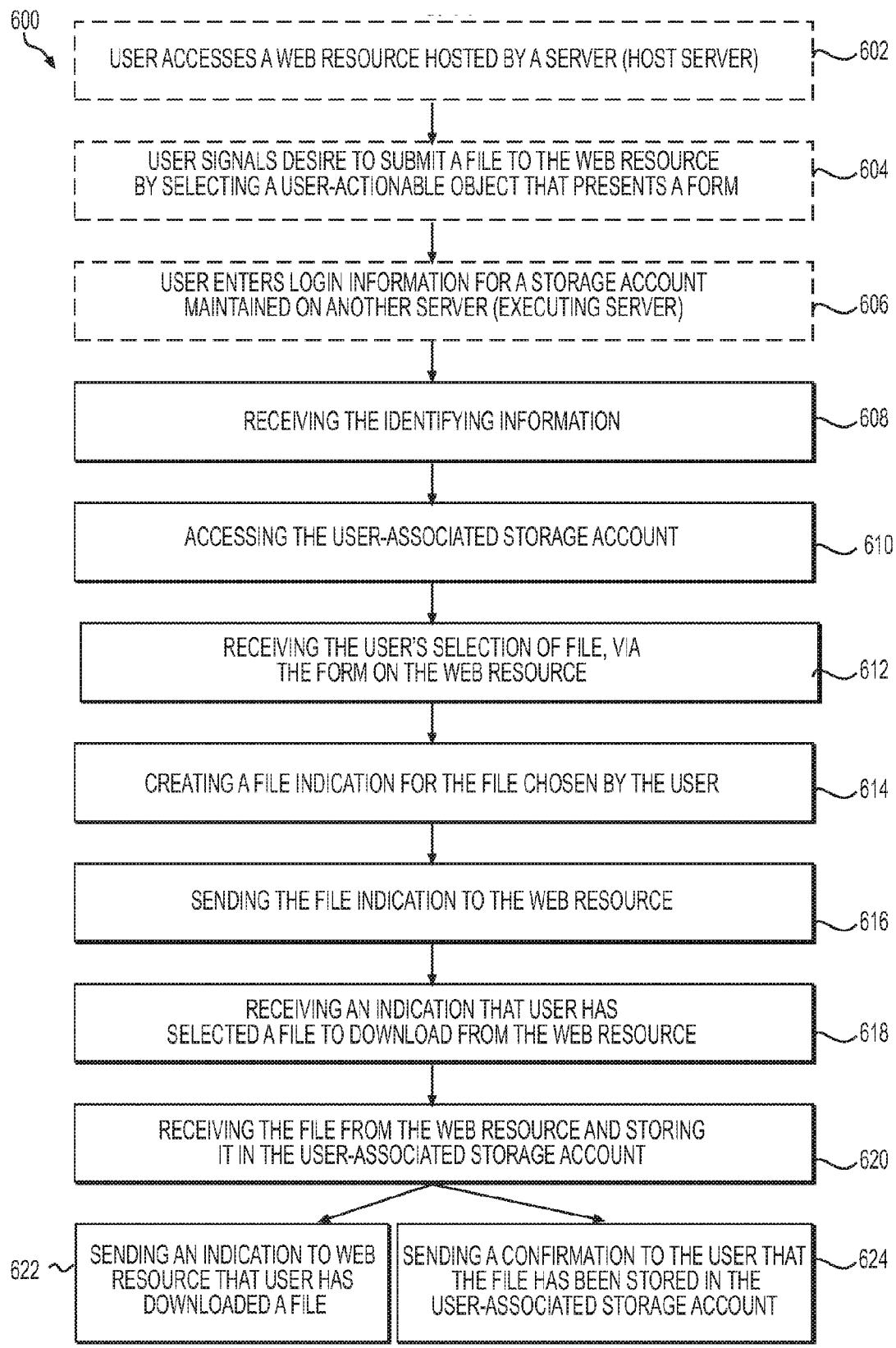
FIG. 6 is a flow diagram of a method for providing access to a file to a web resource, the method being executable within the system of FIG. 1 and being implemented in accordance with non-limiting embodiments of the present technology.
Figure 7:
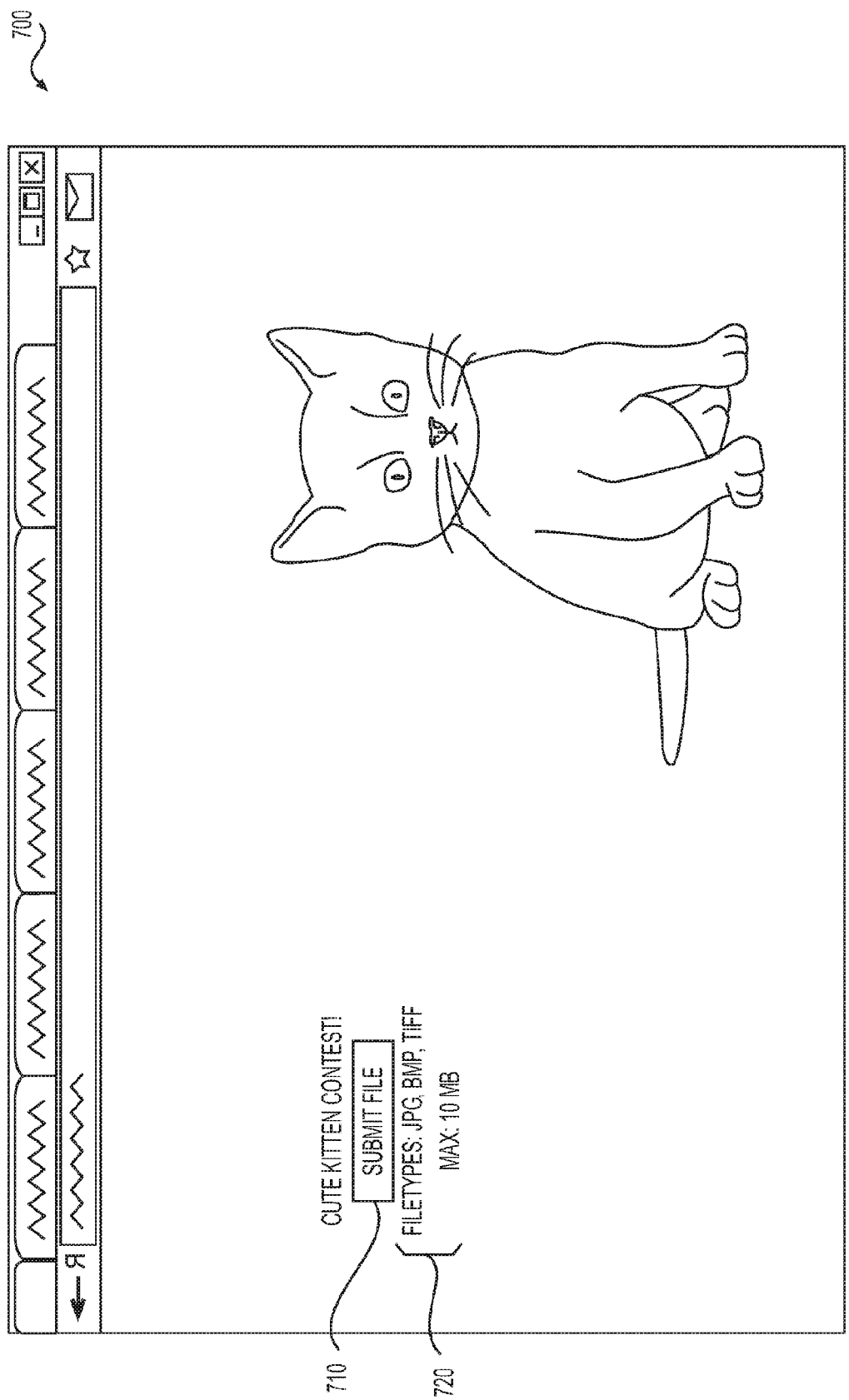
FIG. 7 is a screenshot of an example of a web resource that may implement a method for providing access to a file to a web resource, the method being executable within the system of FIG. 1 and being implemented in accordance with non-limiting embodiments of the present technology.

A flow diagram for another non-limiting embodiment of a method 600 for providing access to a file to a web resource 135 implemented according to the present technology is presented in FIG. 6. The method 600 can be executed by the executing server 110.

The method 600 begins at step 608, where the executing server receives identifying information from the web resource host server 130 hosting the web resource 135. The identifying information has been generated by the web resource host server 130 in the following manner.

The user first, at step 602, accesses the web resource 135 on the web resource host server 130. How the user can access the web resource 135 has been described above and, as such, will not be described here at any length.

The user, at step 604, signals a desire to provide access to a file to the web resource 135 by activating a form on the web resource 135. The user then, at step 606, enters their identifying information into the form.

The web resource 135 captures the user's identifying information and transmits same (or at least a portion thereof) to the executing server 110 over the communication network 120. This information can be transmitted using known protocols (encrypted or not, as the case may be). It should be noted that in FIG. 6, steps 602 to 606 are depicted in dotted lines, as they do not form part of the method 600 executed on the executing server 110 per se.

Based on the identifying information, the executing server 110 then, at step 610, accesses the user-associated storage account 115, maintained on the executing server 110. The executing server 110 then, as part of step 612, receives a selection from the user of the file to be transmitted to the web resource 135, via the form presented by the web resource 135. The selection can take one of many forms described above, such as selecting a file from those stored on the user-associated storage account 115, uploading a file to the user-associated storage account 115 or a combination of the two.

Based on the selection by the user, the executing server 110 then, at step 614, creates a file indication of the file chosen by the user in step 612 and then, at step 616, sends the file indication to the web resource 135.

Within the method 600, it is assumed that the user is further desirous of downloading a file from the web resource 135.

At step 618, receives an indication that the user has selected a different file to be downloaded from the web resource 135 to the user-associated storage account 115. The user can select the file to be downloaded in a convention manner, such as clicking on a graphical icon associated with the file, selecting a check box associated with the file or the like.

Then, at step 620, the executing server 110 receives the file chosen by the user to be downloaded from the web resource 135 and stores it in the user-associated storage account 115.

The executive server 110 then, at step 622, sends an indication to the web resource 135 that the user has downloaded a file. In place of the step 622, or in addition to it, the executing server 110 may, at step 624, send a confirmation to the user that the file has been stored in the user-associated storage account 115.

Referring to FIGS. 7-11 concurrently, screenshots of an example of the web resource 135 implementing a non-limiting embodiment of a method for providing access to a file to a web resource are illustrated. This web resource 135 is a web page holding a "Cute Kitten Contest". If a user wishes to enter the contest, they click on the user-actionable button marked "Submit File" 710 in FIG. 7. This button 710 activates a form 810 (see FIG. 8) with which the user can interact to transmit their file for the contest to the web resource 135.

Figure 8:
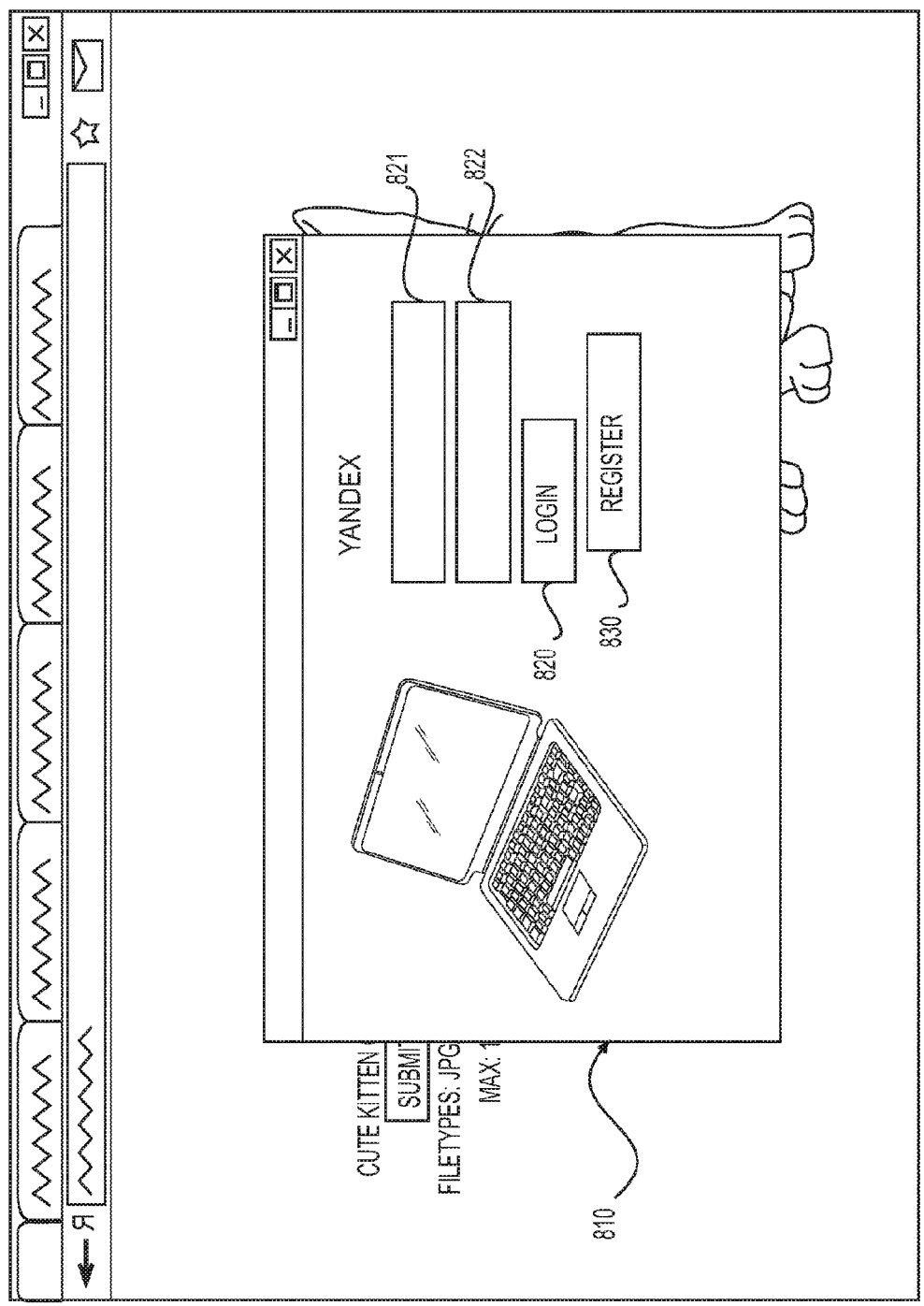
FIG. 8 is a screenshot of the web resource of FIG. 7, displaying a form for transferring a file to the web resource according to non-limiting embodiments of the method of the present technology, at a step in the method for collecting identifying information from the user.

Upon presentation of the form 810, shown in FIG. 8, the user is prompted to enter identifying information. As in the case of the method 300, the user may enter login information, such as username 821 and a password 822, and then the user clicks on the Login button 820. If instead the method 500 is used, the identifying information to be provided by the user to the executing server 110 via the form 810 is registration information, which may be supplied by clicking on the Register button 830. Within the illustration of FIG. 8, the same form is used for registering and for logging in. Naturally, two separate forms can be used.

The form 810 (or, more specifically, the source code for executing the form 810) can be supplied to the web resource host server 130 hosting the web resource 135 by the executing server 110. The form 810 can be supplied in some embodiments as a script, including but not limited to: a Java script, an HTML script, a PHP Server-Side script or a CGI script. In some embodiments, the operator of the web resource 135 can access a provisioning web page (not depicted) hosted on the executing server 110 to generate the source code for the form 810, based on one or more preferences selected by the operator of the web resource 135 using the provisioning web page).

The source code for the form 810 can be used to control what types of files, files sizes, colors and images on the form, language, if file will preview, etc. The types of files that could be handled by the present technology via the form 810 include, but are not limited to: pdf, jpeg, gif, doc, docx, xslx, avi, mpeg, zip, rar, mp3, mp4, etc. The types of files and the maximum file size 720 allowed in this particular example are displayed on the web page 700.

Figure 9:
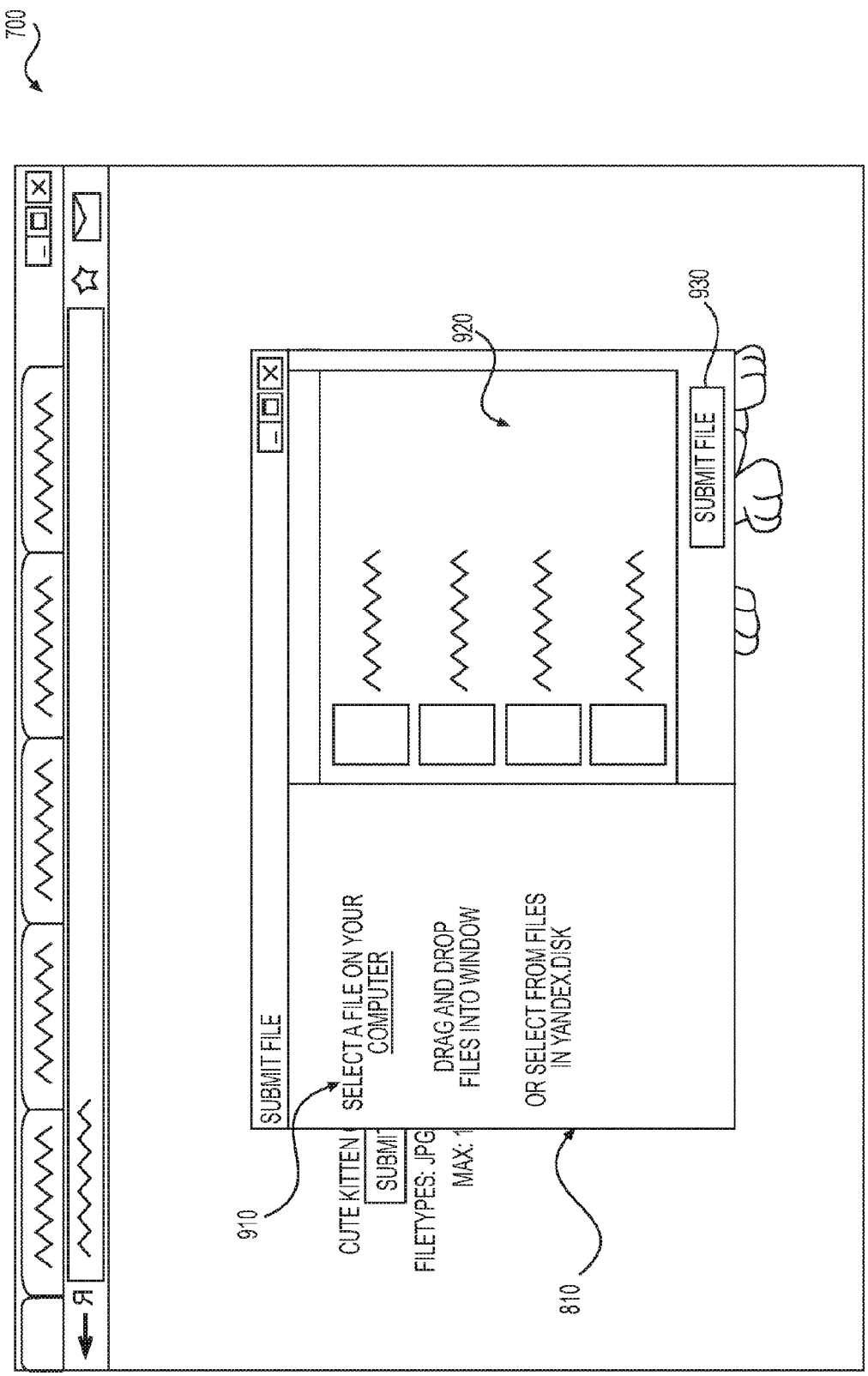
FIG. 9 is a screenshot of the web resource of FIG. 7, displaying the form for transferring a file to the web resource according to non-limiting embodiments of the method of the present technology, at a step in the method for selecting the file to be transferred.

As shown in FIG. 9, upon receipt of the identifying information, the executing server 110 accesses the user-associated storage account 115. In the case of this example, there are already files saved in the user-associated storage account 115 and the executing server 110 causes the web resource, via the electronic device 140, to display at least some of the contents in the form 810, in a content display section 920. How the content display section 920 is formatted is not particularly limited and can be organized based on preferences of the operator of the executing server 110 or user-selected preferences provided by the operator of the web resource 135.

This causing can be executed by the executing server 110 transmitting an indication of some or all of the files stored within the user-associated storage account 115 to the electronic device 140.

The form 810 also displays a prompt for the user to provide access to the web resource 135 to files stored on the electronic device 140 associated with the user, by dragging the file into the upload section 910 in the form 810. Naturally any other way to indicate which ones of the files the user wants to provide access to the web resource 135 can be used. These other ways include but are not limited to: clicking on the file, selecting a check box and the like.

Once the user has selected a file (or a plurality of files, as the case may be) already stored to the user-associated storage account 115 or a file uploaded through the form 810, the user can activate the button Submit File 930 to provide access to the file to the web resource 135 presenting the form 810. Upon receipt of an indication of the user selection, the executing server 110 then creates an indication of the file and sends it to the web resource 135.

Figure 10:
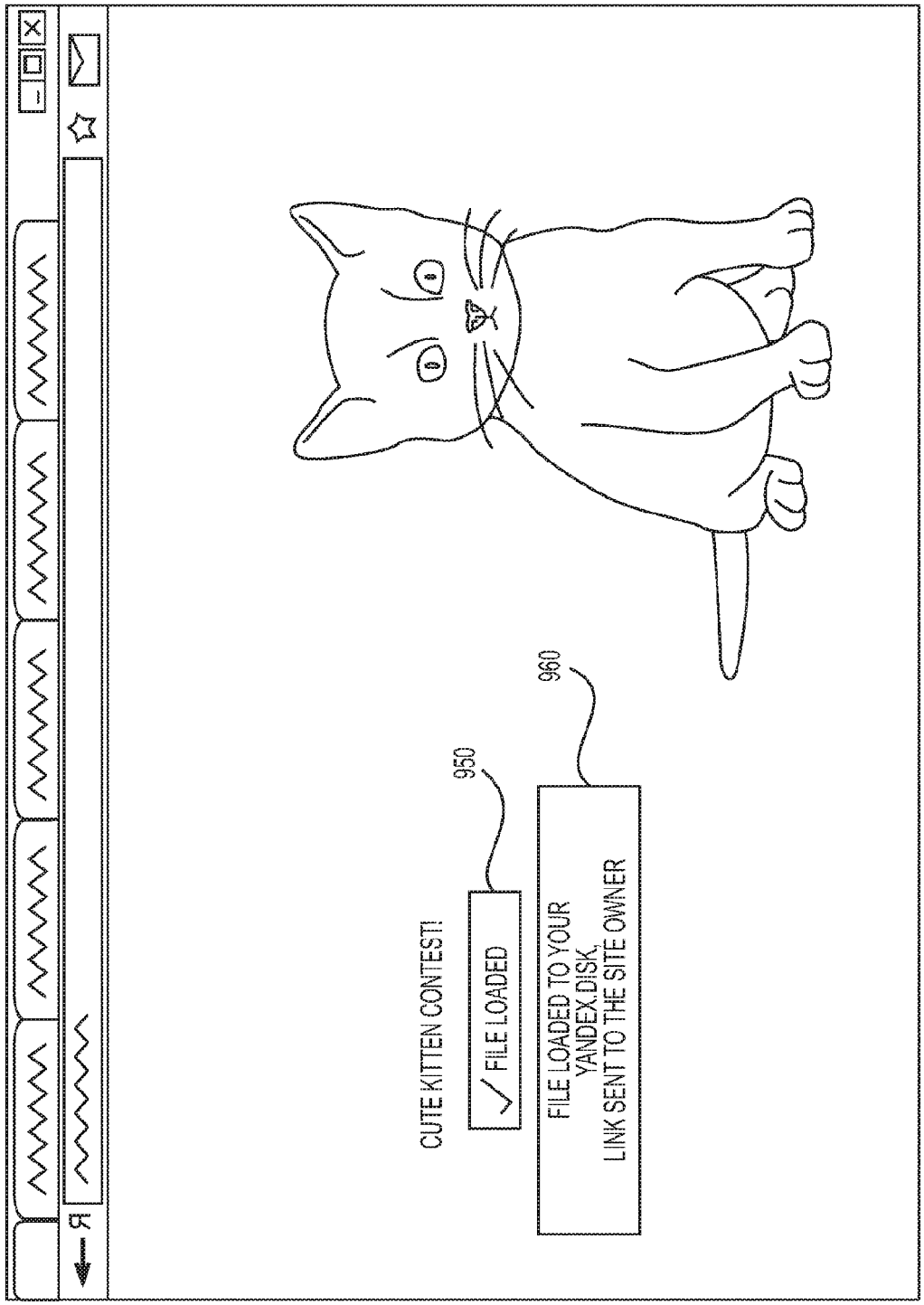
FIG. 10 is a screenshot of the web resource of FIG. 7, displaying a confirmation of transferring a file to the web resource according to non-limiting embodiments of the method of the present technology.

As displayed in FIG. 10, the web resource 135 may present one or more of a confirmation 950, 960 to the user that access to the file has been provided to the web resource 135. In other embodiments, the executing server 110 may send a confirmation directly to the user.

Figure 11:
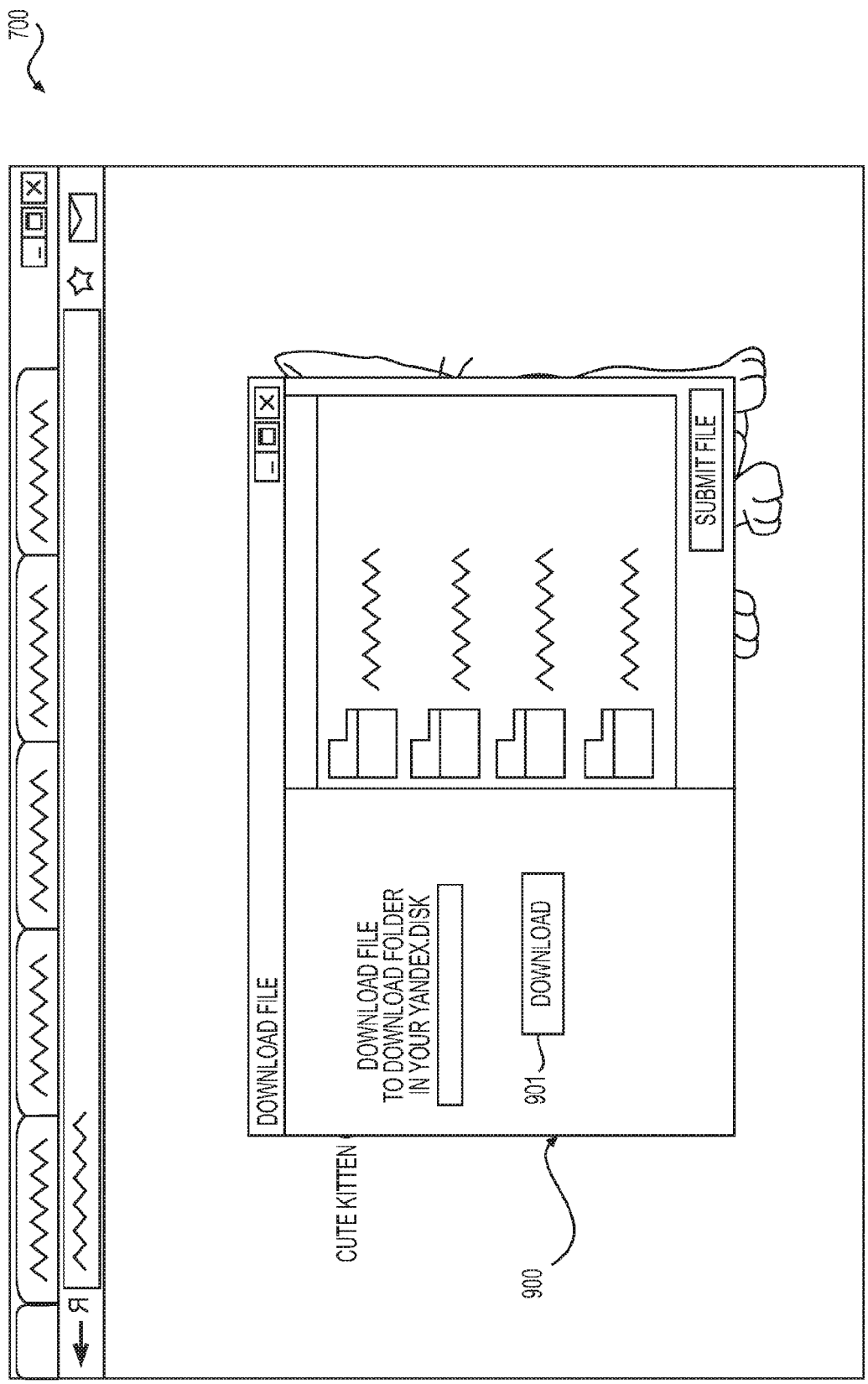
FIG. 11 is a screenshot of the web resource of FIG. 7, displaying a form for transferring a file from the web resource to the storage account of the user, according to non-limiting embodiments of the method of the present technology.

As in the method 600 discussed earlier, in some embodiments of the present technology, the user may further indicate a desire to transmit a file from the web resource 135 to the user-associated storage account 115. As illustrated in FIG. 11, the web resource 135 presents another form 900 to the user in order to save a file in the user-associated storage account 115. Form 900 may also be provided to the web resource host server 130 by the executing server 110.

Within various embodiments of the present technology, the file indication may be implemented as creating a link within the cloud storage account associated with the web resource 135 (or an operator thereof). So, rather than simply transmitting the link to the web resource 135, various embodiments of the present technology contemplate storing (or duplicating by a link) the file(s) selected by the user on the cloud storage account associated with the web resource 135.

Hence it can be said that in some embodiments of the present technology, the step of transmitting to the web resource 135 the file indication comprises saving the file indication in a storage account associated with an administrator of the web resource 135.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of providing access to a file to a web resource from a user, the method executable at a first server, the first server maintaining a storage account associated with the user, the storage account having the file stored therein, the web resource being stored on a second server that is separate from the first server and is in communication with the first server via a communication network, the method comprising:

receiving, by the first server, identification information from the user, via the communication network, from the second server, the identification information having been generated by the user having:

accessed the web resource on the second server, via an electronic device associated with the user, the electronic device being separate from the first server and the second server and being in communication with the communication network, indicated a desire to allow the first server to provide the web resource on the second server access to the file, been presented a form on the electronic device via the web resource, and entered identifying information into the form;

accessing, by the first server, the storage account based upon the identification information;

receiving, by the first server, a selection of the user, via the form, of the file to be accessed by the web resource on the second server from files stored in the storage account;

creating, by the first server in response to the selection of the user, a file link to the file to be accessed by the web resource on the second server; and transmitting, by the first server, the file link to the web resource on the second server, the file link being configured to allow the web resource on the second server to access the file stored on the first server without having to (i) transmit the file via the communication network from the first server to the second server and (ii) store the file on the second server, the file becoming accessible to both the first server and the second server.

2. The method of claim 1, wherein said transmitting to the web resource the file link comprises saving the file link in a storage account associated with an administrator of the web resource.

3. The method of claim 1, wherein:
the identifying information is a user login information for the storage account maintained by the first server; and
said accessing the storage account comprises presenting to the user files previously stored in the storage account.

4. The method of claim 1, wherein:
the identifying information is a user login information for the storage account maintained by the first server; and
said accessing the storage account comprises presenting to the user files previously stored in the storage account, the method further comprising:

receiving an indication from the user, via the form, to copy the file to the storage account from the electronic device associated with the user via the communication network, receiving the file from the electronic device associated with the user via the communication network, and storing the file in the storage account maintained by the first server.

5. The method of claim 1, wherein:
the identifying information is a user registration information for the storage account maintained by the first server;
said receiving the identification information from the user further comprises creating the storage account maintained by the first server; and
said accessing the storage account comprises:

inviting the user, via the form, to copy the file to the storage account from the electronic device associated with the user via the communication network, receiving the file from the electronic device associated with the user via the communication network, and storing the file in the storage account maintained by the first server.

6. The method of claim 1, further comprising:
transmitting a confirmation to the user, via the electronic device, that the web resource has been transmitted the file link.

7. The method of claim 1, further comprising:
transmitting a confirmation to an administrator of the web resource, via the communication network, that the web resource has been transmitted the file link.

8. The method of claim 1, wherein the file is a first file, the method further comprising:
receiving an indication from the web resource of a selection by the user of a second file on the web resource.

9. The method of claim 8, further comprising:
receiving the second file from the web resource via the communication network; and
storing the second file in the storage account maintained by the first server.

10. The method of claim 9, further comprising:
sending, to the web resource, an indication of the user having saved the second file in the storage account.

11. The method of claim 9, further comprising:
sending, to the user via the electronic device associated with the user, a confirmation of the second file having been saved in the storage account.

12. The method of claim 1, wherein the form on the web resource is provided by the first server to the web resource as a script.

13. The method of claim 12, wherein the script is at least one of:
a Java script;
a PHP Server-Side scripting language;
an HTML script; and
a CGI script.

14. A server for providing access to a file to a web resource, the file being stored in a user-associated account maintained by the server, the web resource being stored on a second server, the server comprising: a communication interface for communication with at least one electronic device via a communication network, and a processor operationally connected with the communication interface, the processor of the server being configured to:

receive identification information from the user, via the communication network, from the second server, the second server storing the web resource, the second server being separate from the server, both the server and the second server being in communication with the communication network, the identification information having been generated by the user having:
- accessed the web resource on the second server, via an electronic device associated with the user, the electronic device being in communication with the communication network,
  - indicated a desire to allow the server to provide the web resource on the second server access to the file,
  - been presented a form on the electronic device via the web resource, and entered identifying information into the form;
- access the user-associated storage account based upon the identification information;
- receive a selection of the user, via the form, of the file to be accessed by the web resource on the second server;
- create a file link to the file stored in the user-associated storage account in response to the selection of the user; and
- transmit the file link to the web resource on the second server, the file link configured to allow the web resource on the second server to access the file stored on the server without having to (i) transmit the file via the communication network from the server to the second server and (ii) store the file on the second server.

15. The server of claim 14, wherein to transmit to the web resource on the second server the file link the processor is configured to save the file link to a storage account associated with an administrator of the web resource.

16. The server of claim 14, wherein
the identifying information is a user login information for the user-associated storage account maintained by the server; and
to access the user-associated storage account the processor is configured to present to the user files previously stored in the user-associated storage account.

17. The server of claim 14, wherein
the identifying information is a user login information for the user-associated storage account maintained by the server; and
to access the user-associated storage account the processor is configured to present to the user files previously stored in the user-associated storage account, the processor being further configured to:
  receive an indication from the user, via the form, to copy the file to the user-associated storage account from the electronic device associated with the user via the communication network,
  receive the file from the electronic device associated with the user via the communication network, and
  store the file in the user-associated storage account maintained by the server.

18. The server of claim 14, wherein
the identifying information is a user registration information for the user-associated storage account maintained by the server;
to receive the identification information from the user, the processor is further configured to create the user-associated storage account maintained by the server; and
to access the user-associated storage account, the processor is configured to:
  invite the user, via the form, to copy the file to the user-associated storage account from the electronic device associated with the user via the communication network,
  receive the file from the electronic device associated with the user via the communication network, and
  store the file in the user-associated storage account maintained by the server.

19. The server of claim 14, the processor further configured to:
transmit a confirmation to the user, via the electronic device, that the web resource has been transmitted the file link.

20. The server of claim 14, the processor further configured to:
transmit a confirmation to an administrator of the web resource, via the communication network, that the web resource has been transmitted the file link.

* * * * *